(12) United States Patent
Stankey et al.

(10) Patent No.: US 9,525,732 B2
(45) Date of Patent: *Dec. 20, 2016

(54) SOCIAL NETWORKING AND NETWORK CONNECTIVITY

(71) Applicant: AT&T Intellectual Property I, L.P., Atlanta, GA (US)

(72) Inventors: John Thomas Stankey, Dallas, TX (US); Dale W. Malik, Atlanta, GA (US); Jeffrey Mikan, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,257

(22) Filed: Oct. 31, 2015

(65) Prior Publication Data

US 2016/0057216 A1 Feb. 25, 2016

Related U.S. Application Data

(63) Continuation of application No. 14/255,025, filed on Apr. 17, 2014, now Pat. No. 9,203,929, which is a continuation of application No. 12/466,508, filed on May 15, 2009, now Pat. No. 8,737,260.

(51) Int. Cl.
*H04W 4/00* (2009.01)
*H04L 29/08* (2006.01)
*H04M 3/42* (2006.01)
*H04M 7/12* (2006.01)

(52) U.S. Cl.
CPC ....... *H04L 67/1078* (2013.01); *H04L 67/1097* (2013.01); *H04L 67/306* (2013.01); *H04L 67/327* (2013.01); *H04M 3/42059* (2013.01); *H04M 3/42102* (2013.01); *H04W 4/00* (2013.01); *H04M 3/42136* (2013.01); *H04M 7/1205* (2013.01); *H04M 2207/12* (2013.01)

(58) Field of Classification Search
CPC ...................................................... H04W 4/00
See application file for complete search history.

(56) References Cited

U.S. PATENT DOCUMENTS

| 5,086,394 | A | 2/1992 | Shapira |
| 5,901,359 | A | 5/1999 | Malmstrom |
| 5,926,765 | A | 7/1999 | Sasaki |
| 6,434,139 | B1 | 8/2002 | Liu et al. |
| 6,493,556 | B1 | 12/2002 | Stinson |
| 6,549,768 | B1 | 4/2003 | Fraccaroli |
| 6,587,691 | B1 | 7/2003 | Granstam et al. |
| 6,947,737 | B2 | 9/2005 | Massey et al. |
| 6,967,971 | B1 | 11/2005 | Elliott |

(Continued)

*Primary Examiner* — John Blanton
(74) *Attorney, Agent, or Firm* — Scott P. Zimmerman, PLLC

(57) ABSTRACT

Social networking is used to enhance content delivery to mobile devices. Sometimes a mobile device lacks network connectivity, such as when the mobile device is off or offline. Content cannot be sent to the mobile device when lacking network connectivity. A social network, however, may be retrieved for interim storage of the content. When the mobile device lacks network connectivity, the content may be routed to a member device of the social network. The member device stores the content until the mobile device resumes network connectivity. The member device may then send or forward the content to the mobile device.

20 Claims, 5 Drawing Sheets

(56) References Cited

U.S. PATENT DOCUMENTS

| | | | |
|---|---|---|---|
| 6,968,179 | B1 | 11/2005 | De Vries |
| 7,020,087 | B2 | 3/2006 | Steinberg et al. |
| 7,113,797 | B2 | 9/2006 | Kelley et al. |
| 7,202,814 | B2 | 4/2007 | Caspi et al. |
| 7,224,966 | B2 | 5/2007 | Caspi et al. |
| 7,251,696 | B1 | 7/2007 | Horvitz |
| 7,266,395 | B2 | 9/2007 | Schnurr |
| 7,310,676 | B2 | 12/2007 | Bourne |
| 7,394,803 | B1 | 7/2008 | Petit-Huguenin et al. |
| 7,395,055 | B2 | 7/2008 | Chitrapu |
| 7,408,920 | B2 | 8/2008 | Berkley et al. |
| 7,433,929 | B2 | 10/2008 | Guilford et al. |
| 7,551,577 | B2 | 6/2009 | McRae |
| 7,565,448 | B1 | 7/2009 | Schlesener et al. |
| 8,737,260 | B2 * | 5/2014 | Stankey ............ H04M 3/42059 370/254 |
| 9,203,929 | B2 * | 12/2015 | Stankey ............ H04M 3/42059 |
| 2005/0044144 | A1 * | 2/2005 | Malik .................. H04L 12/581 709/205 |
| 2005/0085219 | A1 | 4/2005 | Noldus |
| 2005/0135333 | A1 | 6/2005 | Rojas |
| 2005/0174975 | A1 | 8/2005 | Mgrdechian et al. |
| 2008/0064374 | A1 | 3/2008 | Coffing |
| 2008/0101224 | A1 | 5/2008 | Khasnabish |
| 2008/0126484 | A1 | 5/2008 | Wherry et al. |
| 2010/0057754 | A1 | 3/2010 | Moudy et al. |

\* cited by examiner

SOCIAL NETWORKING AND NETWORK CONNECTIVITY

CROSS-REFERENCE TO RELATED APPLICATIONS

This application is a continuation of U.S. application Ser. No. 14/255,025 filed Apr. 17, 2014 and since issued as U.S. Pat. No. 9,203,929, which is a continuation of U.S. application Ser. No. 12/466,508 filed May 15, 2009 and since issued as U.S. Pat. No. 8,737,260, with both applications incorporated herein by reference in their entireties.

FIELD

The disclosed technology, in one embodiment, relates generally to communication between at least two parties and to methods and systems for determining a preferred connection between the two parties for any purpose, including without limitation for the transfer of multimedia content between the parties.

BACKGROUND

Technologies relating to the transmission of voice, data, video and other multimedia have been converging, enabling various networks to interact and thereby provide a plethora of multimedia offerings. For example, the Video Share™ service of AT&T is offered over mobile networks and may be enabled by IMS (IP Multimedia System). Through the Video Share™ service, users that are engaged in a mobile voice call can initiate a packet-implemented, video streaming session. In another example of converging technologies, dual mode handsets permit a customer's mobile terminal to support, for example, access to both cellular networks and local area networks.

Databases are used to assist in the provision of various services. For example, Jini, developed at Sun Microsystems, is a distributed computing architecture over which a service may operate. As part of the Jini architecture, there may be a database lookup service which may provide, to a client that wants to use the service, information on how to connect directly to the service.

In other technologies, information relating to users enables those users to communicate with each other more effectively. U.S. Pat. No. 7,310,676 discloses "a business or social networking method [that] is operative in a server. The method enables mobile device users to meet one another, on a permission basis. The determination of whether a given pair of mobile device users are introduced depends on whether the server determines they are in intellectual or 'cognitive' proximity, which is typically a function of one or more factors, such as: each user's reciprocal networking objective, the nature of the industry in which the user works, the user's level within the management hierarchy of his or her company, any specialty function the individual may possess, and so on. Individuals who are matched in one or more of such attributes to a given degree or threshold are said to be in intellectual proximity. According to the invention, when given mobile devices users are within physical proximity of one another during an overlapping time window, the server determines whether the users are also within a given intellectual proximity."

U.S. Pat. No. 7,251,696 discloses a "system and method for identifying communication channels and appropriate timing of communications that facilitate enhancing or maximizing the utility of a communication between communicating parties, based on the participants' preferences and capabilities. The system and method implement policies for facilitating optimal communications between communicating parties based on deterministic and/or uncertain preferences, capabilities and context, both present and predicted, where a decision to employ an initially selected channel and timing of communication may be overridden by contactor or contactee based on user-configurable triggers. The system and method further provide for mixed/multi-initiative overriding of the identified optimal communication channel and indicated best time for a communication. The methods can be implemented on a wide scale communication system or within a single portable device."

U.S. Pat. No. 5,086,394 discloses "An introduction system for participating users [that] includes for each user a personal device that is subject to activation by remote paging. Each user also has a memory device that contains personal data defining the user by personal characteristics such as traits and interests. A local control unit receives the respective personal data from a plurality of user memory devices and using computer means compares the personal data of each user with the personal data of other users who have within the same time frame entered their personal data into the local control unit via their respective memory devices. Pairs who are matched to predetermined standards by the computer comparison are automatically paged via their personal devices and an introduction is facilitated."

U.S. Patent Application Publication 20080126484 discloses "[a] method and system for determining and sharing a user's web presence . . . . According to one embodiment, a computer implemented method comprises providing web presence information associated with a first user from a first computer having a first software module. The web presence information is received at a second computer. The web presence information is used to dynamically inform a second user communicating with the second computer of a website that the first user is viewing."

U.S. Pat. No. 7,408,920 involves "[a]n Active User Registry system [that] includes a database which is integrated with the POTS network and a packet network to exploit the outstanding strengths of both of its constituents. The Active User Registry database is a dynamic data structure of all the ways in which one or more users can be reached via some type of communication network. A key feature of the Active User Registry is the ability to broker between a subscriber's request for communications contact information corresponding to a user and the user's preferences of being reached by various communications alternatives."

U.S. Pat. No. 5,901,359 involves [a] single-number service for providing integrated wireless and wireline communication networks for forwarding a call incoming to a subscriber's designated single telephone number to a routing destination number based on the subscriber's current location is provided. The single-number service includes storing subscriber mobile registration status in a wireline location register (WLR) of the wireline communication network. The subscriber mobile registration status is retrieved upon receiving the call incoming to the subscriber's designated single telephone number. The call is routed to a wireline destination stored in the WLR in response to the subscriber mobile registration status indicating that the subscriber is wireline registered. A subscriber location request is sent from the WLR to the Home Location Register (HLR) of the wireless network in response to the subscriber mobile registration status indicating that the subscriber is wireless registered. A routing request is sent from the HLR to the MSC where the subscriber is registered in response to receiving the subscriber current location request. A wireless routing destination number (TLDN) is communicated from the MSC to the WLR. The call incoming to the subscriber's directory number is routed by the WLR to the wireless routing destination number (TLDN).

SUMMARY

In one aspect, the disclosed technology relates to determining a preferred communication connection between two parties, who are communication-network end-users, based on the current network connectivity of the parties, where at least one of the parties has connection capability to two different communication networks. The current network connectivity of the parties is determined, for example, by querying a computer database that has information on the current network connectivity of the two parties. In one embodiment of the disclosed technology, the preferred communication connection will be over a combination of networks. The technology may be useful, for example, in exchanging multimedia content between the two parties.

In alternative embodiments of the disclosed technology, the preferred communication connection and exchange of multimedia content will be made in real time. However, in other embodiments of the disclosed technology, the current network connectivity information will lead to the determination that the preferred connection for exchanging multimedia content between the parties involves first transmitting the content to a multimedia relay, where it will remain until the receiving end-user has appropriate network connectivity to receive the content. In such embodiments of the disclosed technology, the network connectivity information will show that the intended recipient of the content has connectivity capability to a network that will permit receipt of the content from the gateway, or likely will have such network connectivity at some time in the future. In accordance with this embodiment of the disclosed technology the intended recipient may then be notified of the availability of the content, or the content may be held at the gateway until the intended recipient has appropriate network connectivity to receive the content. In one embodiment of the disclosed technology, the system may detect when the receiving end-user has established such network connectivity. At that time, the system may either send the content from the gateway to the receiving end-user, or inform the intended recipient that the content may be obtained from the gateway at the convenience of the intended recipient.

In yet another embodiment of the disclosed technology, a system may determine, based on the network connectivity information, that parties, who have not necessarily indicated a desire to exchange multimedia content, can do so, either in real time, or otherwise, and will proactively notify the parties that they have the option to exchange such content.

In an alternative embodiment of the disclosed technology, the network connectivity information will lead to the determination that the multimedia content can be stored on a third end-user's device and thereafter transmitted from the third end-user's device to the intended recipient when the third end-user and the recipient are connected. In such a specific embodiment of the disclosed technology, the third end-user may be remunerated for acting as the "relay" in facilitating the exchange of multimedia content between the sender and the recipient.

DETAILED DESCRIPTION

Figure 1:
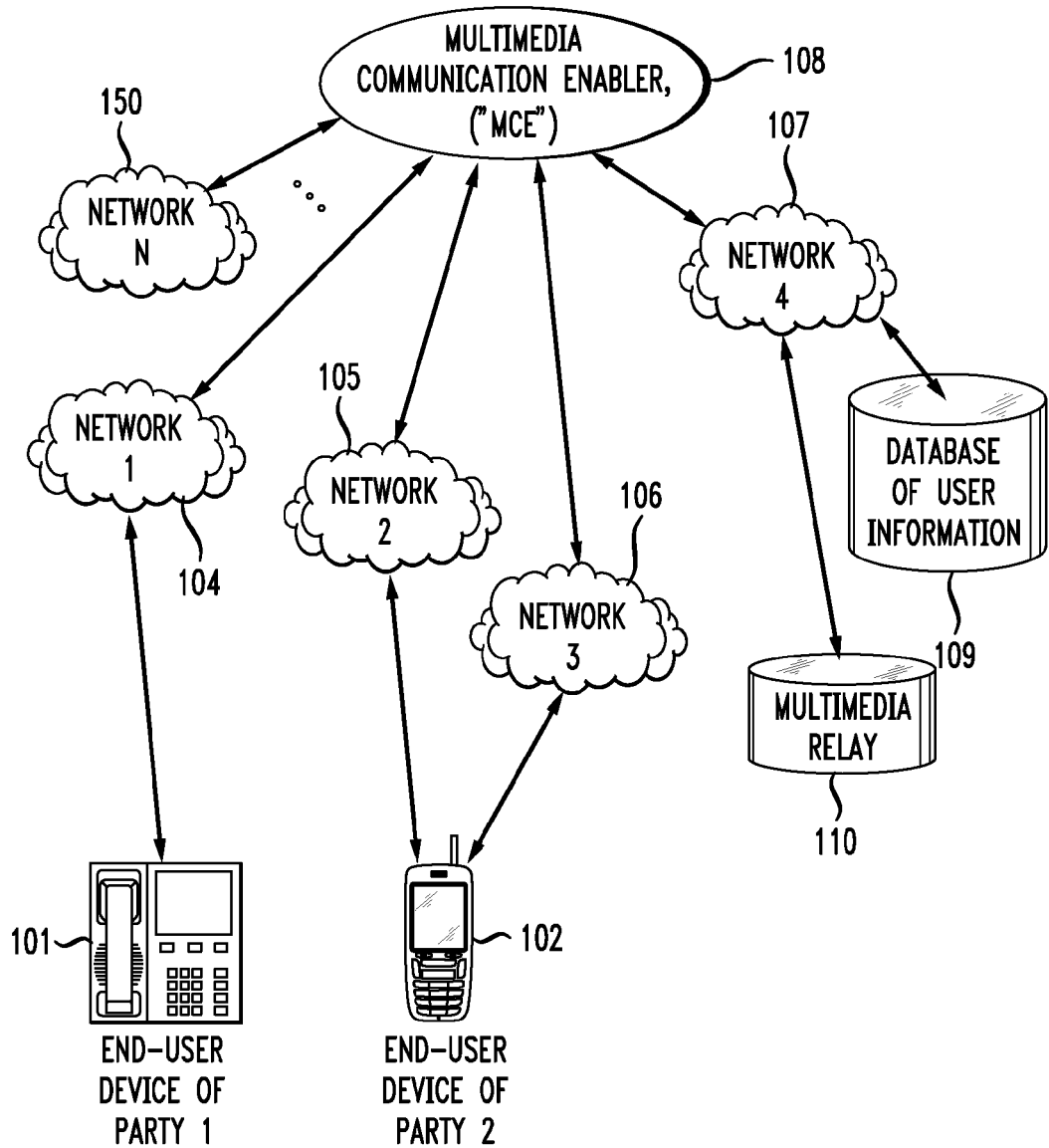
FIG. 1 is a high level schematic of one embodiment of the disclosed technology.

FIG. 1 is a high-level schematic representation of an aspect of the disclosed technology that relates to establishing a preferred communication connection between two parties, who are communication-network end-users based on the current network connectivity of the parties, where at least one of one of the parties has connection capability to two different networks. The disclosed technology will be discussed at high level in terms of FIG. 1 and thereafter will be discussed in greater technical detail in the context of the remaining Figures.

In FIG. 1, element 101 is an end-user communication-device associated with a first party, 1, and element 102 is an end-user communication-device associated with a second party, 2. The end-user communication devices can be any appropriate communication devices, including without limitation, computers, landline phones, cell phones, WiFi enabled devices, or other appropriate mobile or landline devices. In this embodiment of the disclosed technology, Party 1 has connection capability, although not necessarily a current connection, to at least one network, 104, and party 2 has connection capability, although not necessarily a current connection, to at least two networks, 105 and 106. (In alternative embodiments of the disclosed technology party 1 may have a connection capability to two networks.) While party 2 is shown having connection capability to two networks that are different than the network to which party 1 has connection capability, in specific embodiments of the disclosed technology, networks 104 and 105 may be the same network. FIG. 1 shows several networks, including networks 1, 2, 3, and 4 (elements 104, 105, 106, and 107 respectively and network N (element 150). Persons of skill in the art will appreciate that the disclosed technology may be practiced with any number of networks, so long as that number is at least 2.

It will be appreciated by those with skill in the relevant art, that, as shown in FIG. 1, the connection capability that party 2 has to networks 1 and 2 is in the form of parallel connection architecture. This is as opposed to a serial architecture in which party 2 would be connected to network 2 through network 1. In both serial and parallel architectures the party may be connected to two networks. However, in the embodiment of this technology shown in FIG. 1, party 2 has parallel connection capability to the two networks.

In FIG. 1, element 108 is a system that can assist in establishing communication between users that are associated with different networks. Such communication may include the exchange of "multimedia content"—including without limitation, data representative of voice and other audio, video, computer and video games and other interactive content, and still pictures. Accordingly, element 108 is referred to generically as a Multimedia Communication Enabler ("MCE"). Persons having ordinary skill in this art will recognize that aspects of an IP Multimedia Subsystem (IMS) may participate in performing this function. In the embodiment of FIG. 1, MCE 108 assists in the exchange of multimedia content between the End-User Device 101 of Party 1, and the End-User Device 102 of Party 2.

In FIG. 1, element 109 is a database of information relating to the end-users of the two or more networks 1, 2, 3, 4 . . . N. The parties 1 and 2, with which end-user devices 101 and 102 respectively are associated, are among the end-users whose information is stored in database 109. Exemplary information about end-users that can be stored in database 109, includes, without limitation, one or more of, real-time location information associated with the end-users, a list of those networks to which the end-users have parallel connection capability, real-time network connections associated with the end-users, data on how to connect to the end-users, and information relating to those services to which each end-user is entitled.

In specific embodiments the database can be a database that can be accessed by a computer, i.e., a "computer database". It will be appreciated by those with ordinary skill in this art that such a database may be based on electronic, optical, magnetic or other technology. Such databases may include records that are made up of various fields of specific information. In specific embodiments, the database may include at least one record with at least two fields, each of the at least two fields having data indicating the current parallel connectivity of a given end-user to at least one of at least two different networks. In a further specific embodiment, the database may include at least one record with at least two fields, each of the at least two fields having data indicating the current parallel connectivity of a given end-user to at least two of at least two different networks. In a further specific embodiment, each of the two networks may be networks from which the end-user is routinely and voluntarily disconnected from time to time and reconnected from time to time, such as a cellular network as opposed to a landline network.

In specific embodiments of the disclosed technology, the information in the database can be limited to parties that have a specific social preference, for example, parties who live in the same town or geographic community, who are members of the same organization, who are "friends", "buddies" or otherwise linked together in the same on-line or virtual community (e.g., such as Facebook.com, MySpace.com, Linkedin.com, SecondLife.com, etc.) or who have a common interest, such as photography, or multi-player, on-line gaming. Such groups are sometimes called social groups or social networks. In alternative embodiments of the disclosed technology, the database can have information on users associated with many different social groups. In such a database, a specific field or fields may identify specific social groups with which each user is associated. In that way, the database can be used to obtain information that is, for example, limited to users associated with a particular social group.

In a specific embodiment of the disclosed technology, when Party 1 wants to send multimedia content to Party 2, it notifies the MCE 108 of that desire. MCE 108, then queries database, 109, via network, 107, to determine the current parallel network connectivity of each of Party 1 and Party 2. (The term current in this context means at the time the query is made. It will be understood by those in the art that the "current parallel network connectivity" refers, for example, to the connectivity status for devices, such as cell phones, that need not be continuously connected to the network. The tracking of such connectivity may be updated with sufficient frequency to satisfy various needs of the network. While the "current parallel network connectivity" refers to the connectivity shown at the time the query is made, it will be understood that, based on the system, the "current parallel network connectivity" might not reflect the actual connectivity at the exact time the query is made, but rather the connectivity shown, at the time the query is made, by a system that is updated with appropriate frequency.) The determination may be that only one party has current network connectivity, or current parallel network connectivity. Based on that connectivity information, MCE 108, determines a "preferred" connection for communicating multimedia content between the parties. The preferred connection may be selected from among at least two connections between the parties that are possible at the time the network connectivity information is obtained, i.e., "currently possible connections". The determined connection may be identified as "preferred" based, for example, on any appropriate criterion or criteria, including without limitation the needs of the MCE 108, the preferences of the party, the type and size of the content to be sent, the Quality of Service level (QOS) for which the parties have subscribed, the networks to which the parties are currently connected and cost or pricing considerations. For example, if both parties are on the same WiFi network, the preferred connection may be over that WiFi network. Thereafter, the multimedia content may be transmitted from Party 1 to Party 2 over the preferred connection. In alternative embodiments, the end-users may be given the option to select which, from among a plurality of available connection topologies should be used.

It will be understood by those having skill in this art, that one aspect of the disclosed technology is based on an appreciation that some communication devices may not always be connected to a communication network. These "sometimes connected" devices, such as cell phones, are as opposed to other devices, such as landline phones, which are always connected to the network. Accordingly, as indicated above, in one aspect of this technology, the current network connectivity must be obtained to determine how the parties can be connected. Simply obtaining, for example, a list of cell phone subscribers is insufficient because, at any given time, the cell phone of any given cell phone subscriber may be turned off.

The preferred connection can involve one or more of networks 1 through N. It should be noted that while the N networks in FIG. 1 are shown as distinct from one another, some of the illustrated networks may be one and the same network (e.g., networks 1 and 4 could be one and the same network, networks 3 and N could be one and the same network, etc.). However, in this embodiment of the disclosed technology there must be at least two different networks to which Party 2 is capable of being connected. In this context the term networks refers to equipment and connections that can support communication between two parties. Different networks can be characterized by at least some equipment that differs from network to network. For example, different networks may have different nodes but share transmission resources. Networks may also be characterized by logical definitions that distinguish the networks. Different logical networks can share common equipment, but may be separated by, for example, the association of specific channels or packets with a specific logical network. Different networks may use different transmission or communication protocols, may be operated by different carriers or service providers, or may cover different overlapping or non-overlapping geographic regions. Other possibilities here will be apparent to those of skill in the art.

The preferred connection between the parties can be a real-time connection, for example, when the two parties are connected to the same network, or to different networks that can communicate with each other. However, the preferred connection need not be a real-time connection, for example, when one of the parties is found not to be connected to any network. In accordance with the disclosed technology, one embodiment of a connection that is not real time involves the Multimedia Relay, 110 in FIG. 1. Multimedia Relay, 110, is a server or other storage device to which the multimedia content is sent for interim storage until the multimedia content is transmitted to the intended recipient, for example, Party 2. The multimedia content may be sent by way of network, 107, as shown, or using any alternative appropriate network. Specifically, the network used by the MCE, 108, to communicate with database, 109, need not be the same network used by the MCE, 108, to communicate with the Multimedia Relay, 110.

In a specific embodiment of the disclosed technology a third party, Party 3, can act as operator or provider of Multimedia Relay, 110—for example, if the communication device of Party 3 can store the multimedia content on an interim basis. In such an exemplary embodiment of the disclosed technology, the database may show that Party 1 and Party 3 are members of one social group, and Party 2 and Party 3 are members of a different social group, or that Party 1 and Party 2 do not have connectivity capability to networks that can communicate with each other, while Party 1 and Party 3, on one hand, and Party 2 and Party 3, on the other hand, do have connectivity capability to networks that can communicate. In such circumstances, and others, the preferred connection may involve Party 3 acting as the Multimedia Relay. The transfer can occur in real time, or may be delayed, depending, for example, on the real time network connectivity of the parties, or other factors. In such a specific embodiment of the disclosed technology, Party 3 may be remunerated for acting as the Multimedia Relay and thereby facilitating the exchange of content between the sender and the recipient.

Although, to this point, the discussion of embodiments has involved Party 1 indicating a desire to send content to Party 2, in alternative embodiments, MCE, 108, may include or be connected to, for example, a server that provides a "content matchmaking" service. In such a specific embodiment of the disclosed technology, the MCE, 108, may query the database, 109, to determine users that have, or likely will have, network connectivity capability and/or who are likely to want to exchange multimedia content. MCE, 108 can then send communications to such users informing them of their ability to exchange multimedia content and asking them if they would like to do so. Upon a positive response, the previously disclosed methodology can be implemented to exchange the multimedia content.

Figure 2:
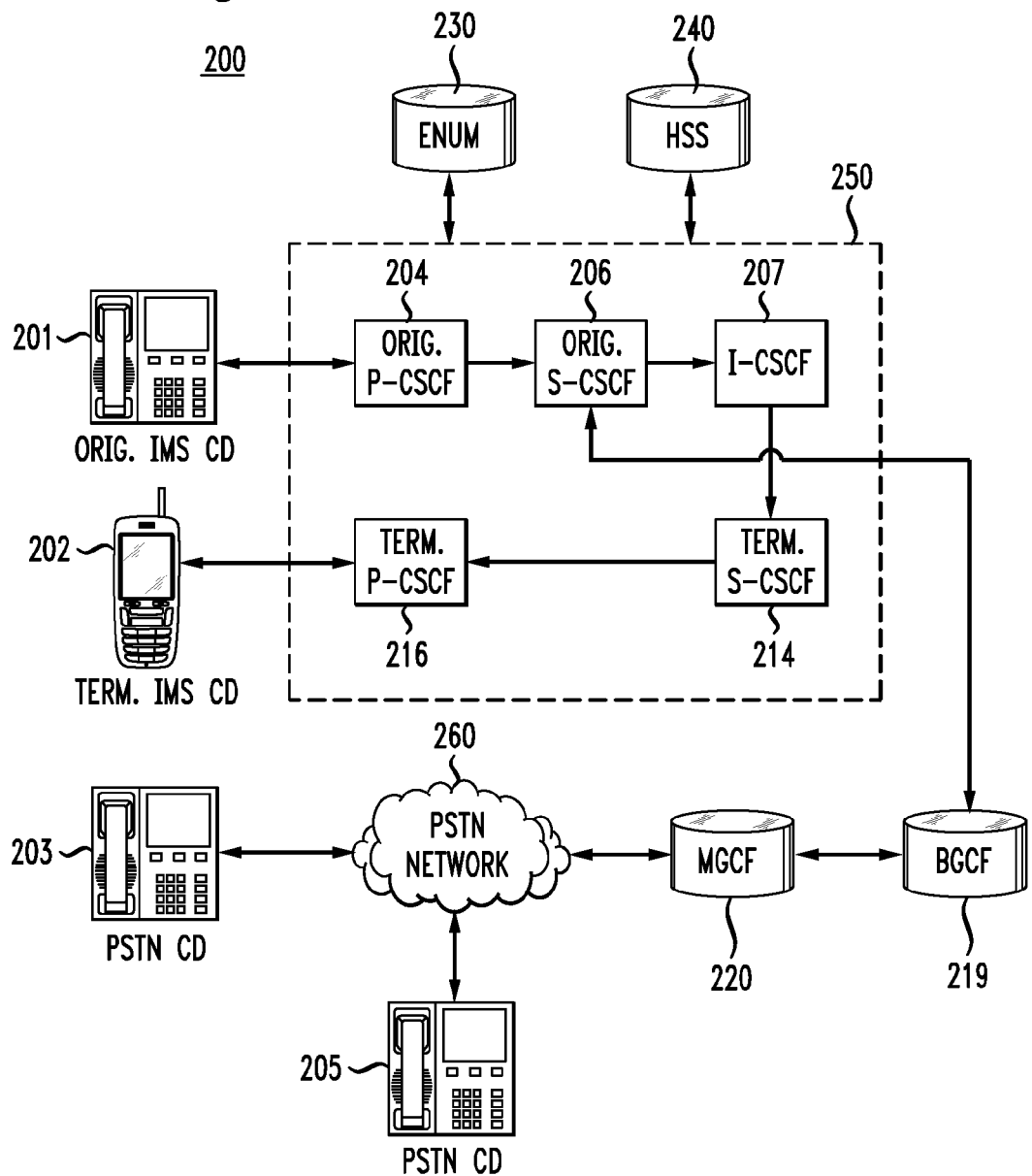
FIG. 2 is a schematic representation of elements of an IMS network architecture that may be used in embodiments of the disclosed technology.

FIG. 2 depicts an IP Multimedia Subsystem (IMS) network architecture that may be used in implementing an embodiment of the disclosed technology. The system of FIG. 2 may be used, for example, to facilitate the interaction between various networks, such as combined services of circuit-switched and packet-switched systems. Communication system 200 can be overlaid or be operably coupled with the system of FIG. 1.

Communication system 200 can comprise a Home Subscriber Server (HSS) 240, a tElephone NUmber Mapping (ENUM) server 230, and other common network elements associated with an IMS network 250. The IMS network 250 can establish communications between IMS compliant communication devices (CD) 201, 202, Public Switched Telephone Network (PSTN) CDs 203, 205, and combinations thereof by way of a Multimedia Relay Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The communication process just described is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
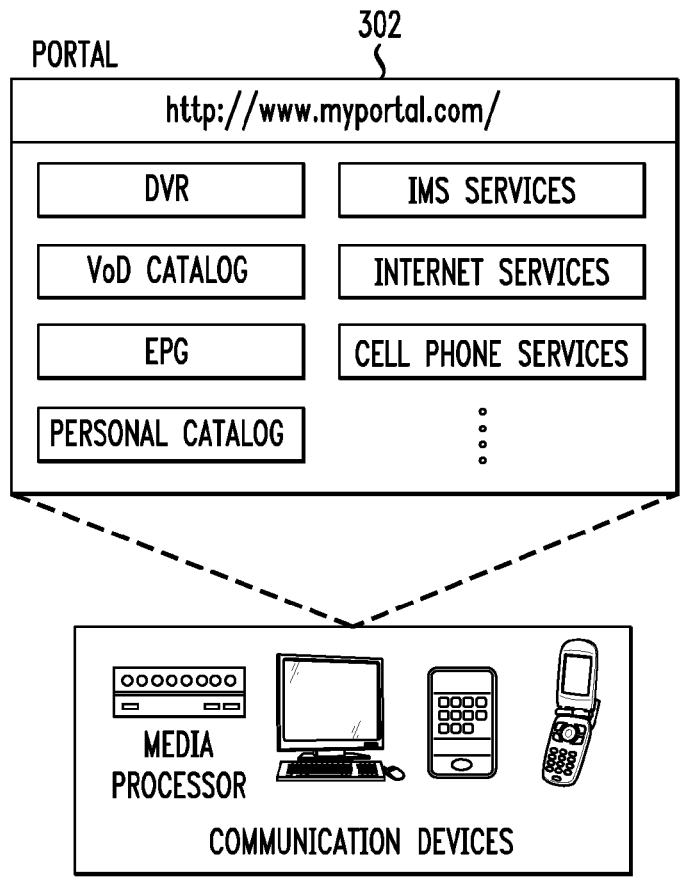
FIG. 3 depicts an illustrative embodiment of the disclosed technology in which a portal can operate from appropriate computing devices

FIG. 3 depicts an illustrative embodiment of the disclosed technology in which a portal 302 can operate from appropriate computing devices. The portal 302 can be accessed by a Uniform Resource Locator (URL) with a common Internet browser such as Microsoft's Internet Explorer or Mozilla Firefox using an Internet-capable communication device such as those described for FIGS. 1 and 2. The portal 302 can be configured, for example, to access a multimedia processor and services managed thereby such as a Digital Video Recorder (DVR), a Video on Demand ("VoD") catalog, an Electronic Program Guide ("EPG"), or a personal catalog (such as personal videos, pictures, audio recordings, etc.).

Figure 4:
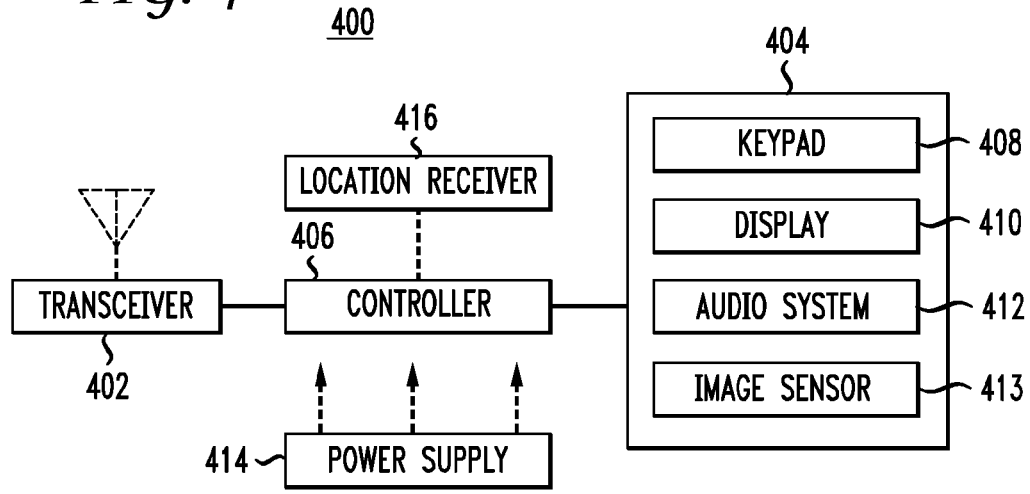
FIG. 4 is a schematic representation of user device that may be used in an embodiment of the disclosed technology.

FIG. 4 depicts an exemplary embodiment of a communication device 400 that may be used in an embodiment of the disclosed technology. Communication device 400 can serve in whole or in part as an illustrative embodiment of the types of communication devices that can be used with the disclosed technology. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA, CDMA-1X, EVDO, W-CDMA/UMTS/HSDPA, GSM/GPRS/EDGE, TDMA, WiFi/802.11, WiMAX/802.16, LTE, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, touch pad or touch screen, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or an alphanumeric (e.g., QWERTY) keypad. The UI 404 can further include a display 410 such as monochrome or color LCD (Liquid Crystal Display), OLED (Organic Light Emitting Diode) or other suitable display technology for conveying images to an end-user of the communication device 400. In an embodiment of the disclosed technology of the disclosed technology where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end-user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. Alternative location technologies, including but not limited to assisted GPS (A-GPS) may also be used. The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the multimedia processor 106, the multimedia devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a multimedia player.

Figure 5:
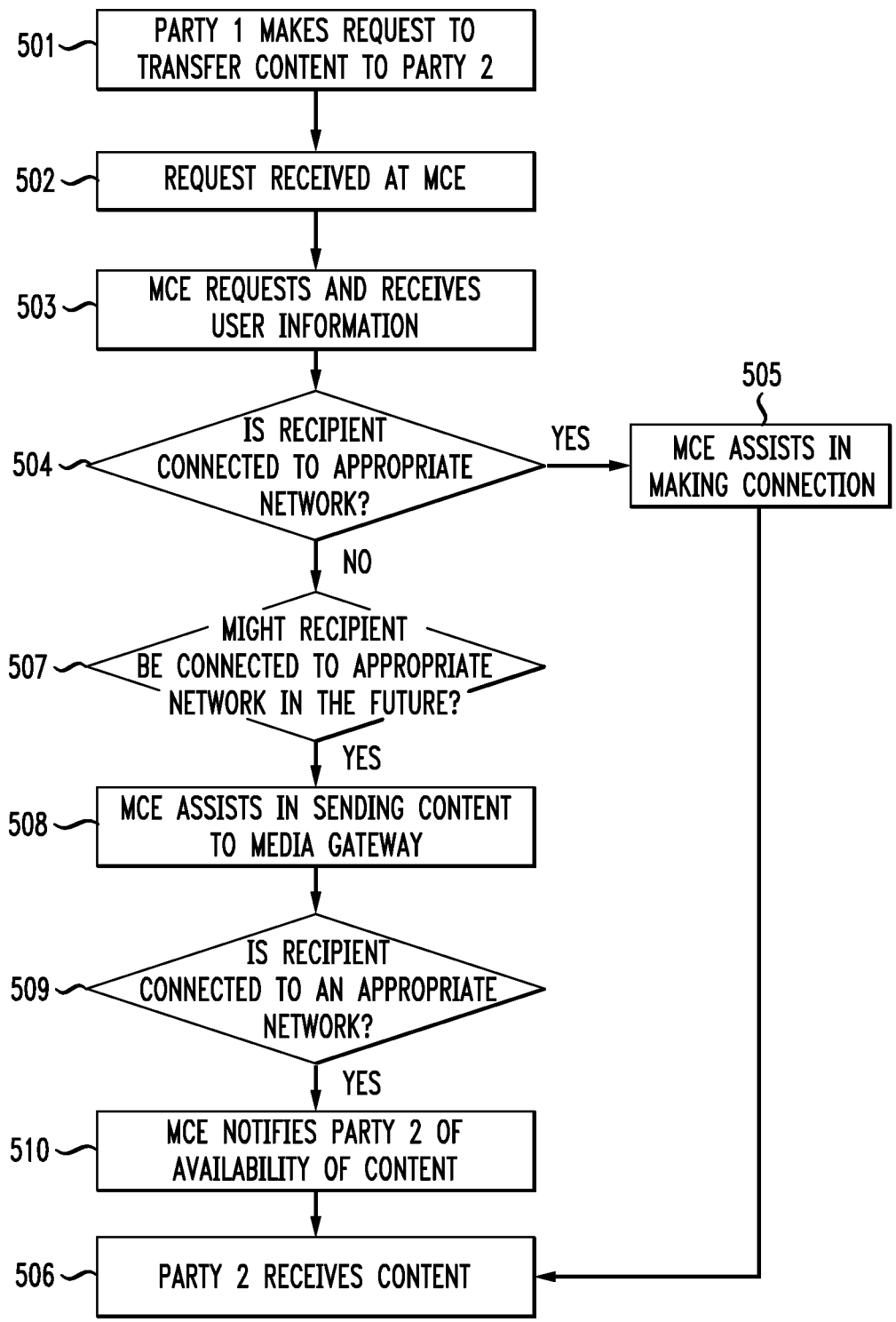
FIG. 5 is a schematic representation of steps that may be performed to implement the disclosed technology.

FIG. 5 depicts an illustrative method of operating one specific embodiment of the disclosed technology. In the embodiment of FIG. 5, at 501 an end-user of a communication device, Party 1, makes a request to transfer multimedia content to a recipient, Party 2. In this embodiment, the request is received at 502 by a Multimedia Communication Enabler ("MCE". For example MCE 108 of FIG. 1). At 503, the MCE requests, and receives, from a database of user information, information relating to Party 2, including information relating to the network connectivity of Party 2. At 504, it is determined whether the Party 2 is connected to a network that would enable Party 1 to immediately transfer the content to Party 2, either directly or through an intermediate network. If Party 2 is connected to such a network, then, at 505, the MCE assists in making the connection between Party 1 and Party 2, enabling Party 2 to receive the multimedia content at 506. The MCE can assist in making the connection in any one of a variety of ways ranging from simply notifying the parties of their availability to communicate with each other, to providing appropriate addresses to the appropriate networks, to actually making the connection.

At 507, it is determined that even though Party 2 is not connected to a network that would permit the immediate transfer of content between Party 1 and Party 2, Party 2 would likely be connected to such a network some time in the future. For example, the user information may show that the two parties frequent the same WiFi network. Accordingly, at 508, the MCE assists in transferring the content from Party 1 to a Multimedia Relay at which the multimedia content is temporarily stored. The MCE can assist in transferring the content in any one of a variety of ways ranging from simply notifying Party 1 communicate with the Multimedia Relay, to providing appropriate addresses to the appropriate networks so that Party 1 can send to content to the Multimedia Relay, to actually making the appropriate connections for Party 1 to send the content to the Multimedia Relay. The MCE may then determine at 509 when, at some time thereafter, Party 2 is connected to a network that would permit Party 2 to connect to the Multimedia Relay. At that time, the MCE may notify Party 2, at 510 that that the multimedia content is available at the Multimedia Relay. At 506, Party 2, at some time thereafter, connects to the Multimedia Relay to obtain the multimedia content. As discussed above, another party, Party 3, may act as a Multimedia Relay if it has appropriate memory to store the multimedia content until Party 2 can access Party 3.

Figure 6:
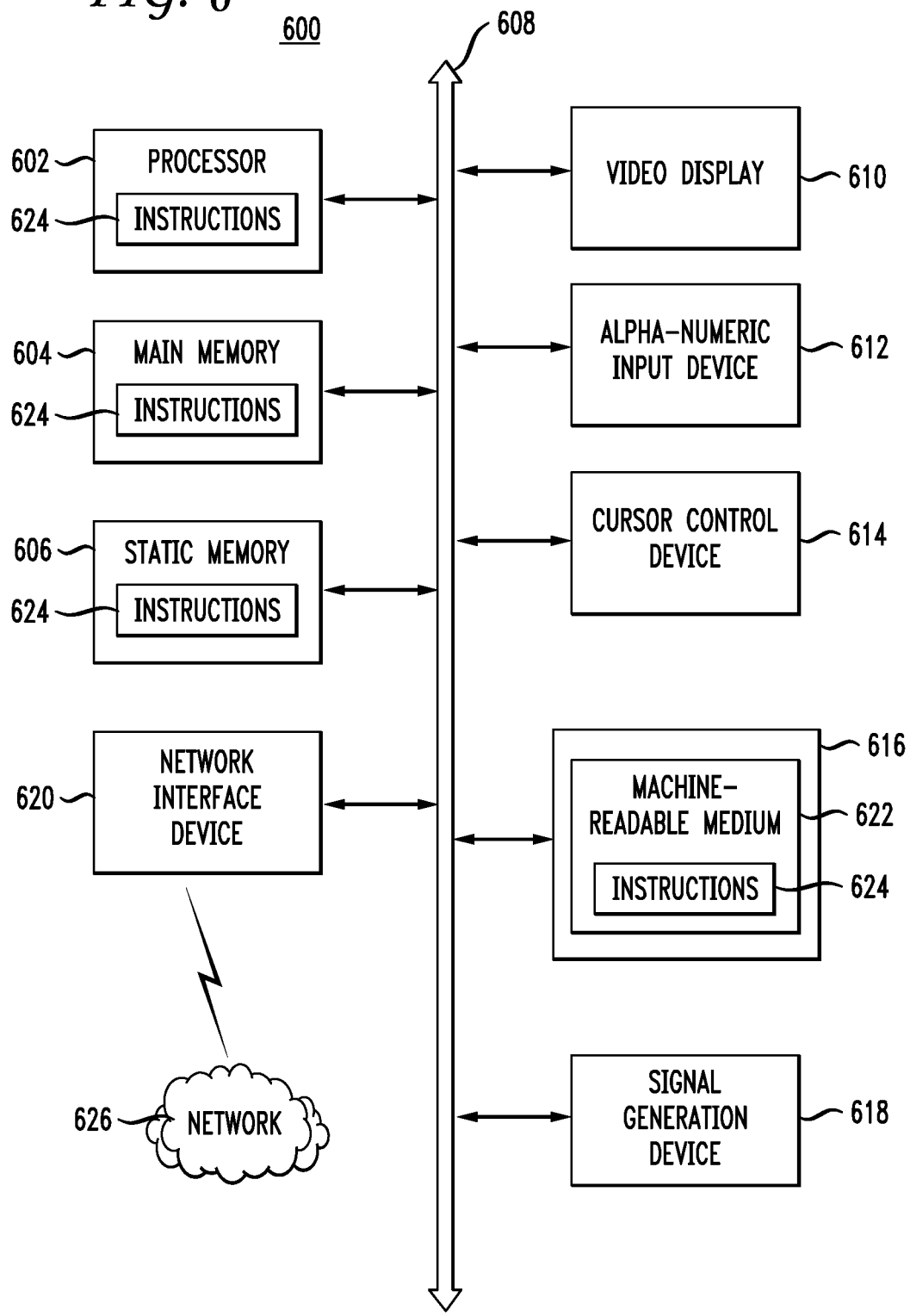
FIG. 6 is a schematic representation of a machine such as a computer that may be used to implement the disclosed technology—for example, the steps of FIG. 5.

FIG. 6 depicts an exemplary diagrammatic representation of a machine in the form of a computer system 600 within which is a set of instructions, such as instructions, such as those relating to the steps of FIG. 5, which, when executed, may cause the machine to perform any one or more of the methodologies and/or technologies discussed in this specification. The instruction may be stored on a computer readable medium, such as, without limitation, a CD or DVD disk, a hard drive, or any other medium which can permanently or temporarily store computer instructions, and from which a computer may obtain the instructions. In some embodiments of the disclosed technology, the machine operates as a standalone device. In other embodiments of the disclosed technology, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, audio, video, interactive content, or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments of the disclosed technology broadly include a variety of electronic and computer systems. Some embodiment of the disclosed technology implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the disclosed technology of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine readable medium containing instructions 624, or that which receives instructions 624 from a propagated signal so that a device connected to a network environment 626 can send or receive voice, video or data, and communicate over the network 626 using the instructions 624. The instructions 624 may further be transmitted or received over a network 626 via the network interface device 620.

While the machine-readable medium 622 is shown in an exemplary embodiment of the disclosed technology to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that accordingly cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self contained information archive or set of archives is considered a distribution medium equivalent to a tangible storage medium. Accordingly, the disclosure is considered to contemplate any one or more of a machine-readable medium or a distribution medium, as listed herein and including art-recognized equivalents and successor media, in which the software implementations herein are stored.

Although the present specification describes components and functions implemented in the embodiments of the disclosed technology with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments of the disclosed technology described herein are intended to provide a general understanding of the structure of various embodiment of the disclosed technology, and they are not intended to serve as a complete description of all the elements and features of apparatus and systems that might make use of the structures described herein. Many other embodiments of the disclosed technology will be apparent to those of skill in the art upon reviewing the above description. Other embodiment of the disclosed technology may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the disclosed technology may be referred to herein, individually and/or collectively, by the term "invention" merely for convenience and without intending to voluntarily limit the scope of this application to any single invention or inventive concept if more than one is in fact disclosed. Thus, although specific embodiments of the disclosed technology have been illustrated and described herein, it should be appreciated that any arrangement calculated to achieve the same purpose may be substituted for the specific embodiment of the disclosed technology shown. This disclosure is intended to cover any and all adaptations or variations of various embodiments of the disclosed technology. Combinations of the above embodiment of the disclosed technology, and other embodiment of the disclosed technologies not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment of the disclosed technology for the purpose of streamlining the disclosure. This method of disclosure is not to be interpreted as reflecting an intention that any claim requires more features than are expressly recited in such claim. Rather, as the following claims reflect, inventive subject matter lies in less than all features of any disclosed embodiment of the disclosed technology.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiment of the disclosed technology shown and described herein are only illustrative of the principles of the claimed invention and that various modifications may be implemented by those skilled in the art without departing from the scope and spirit of the invention. Those skilled in the art could implement various other feature combinations without departing from the scope and spirit of the invention. Accordingly, it should be understood that the claimed invention may be broader than any given embodiment described in this specification, or than all of the embodiments when viewed together. Rather these embodiments are meant to describe aspects of the disclosed technology, not necessarily the specific scope of any given claim.

The invention claimed is:

1. A method, comprising:
   determining, by a server, content associated with a first user for delivery to a second user;
   retrieving, by the server, information describing wireless connectivity associated with the second user;
   determining, by the server, a device associated with the second user lacks the wireless connectivity to a communications network;
   identifying, by the server, a social network associated with the second user lacking the wireless connectivity; and
   selecting, by the server, a member of the social network as an alternate recipient for the content in response to the device associated with the second user lacking the wireless connectivity.

2. The method of claim 1, further comprising selecting a network address from member addresses associated with the social network.

3. The method of claim 1, further comprising sending an electronic notification to the second user notifying of the alternate recipient for the content.

4. The method of claim 1, further comprising sending an electronic notification to the first user notifying of the alternate recipient for the content.

5. The method of claim 1, further comprising sending an electronic notification to the alternate recipient, the notification notifying the alternate recipient of the second user lacking the wireless connectivity.

6. The method of claim 1, further comprising generating an instruction to route the content to a network address associated with the member of the social network selected as the alternate recipient.

7. The method of claim 1, further comprising generating an instruction to route the content for interim storage to a network address associated with the member of the social network selected as the alternate recipient.

8. A system, comprising:
   a processor; and
   a memory device, the memory device storing executable instructions, the executable instructions, when executed by the processor, facilitate performance of operations, the operations comprising:
   receiving electronic packets of data associated with a user associated with a mobile device, the mobile device associated with a recipient network address;
   retrieving information describing wireless connectivity associated with the recipient network address;
   determining that the mobile device associated with the recipient network address lacks the wireless connectivity;
   retrieving a social network associated with the user; and
   routing the electronic packets of data for interim storage to a friend's network address associated with the social network.

9. The system of claim 8, wherein the operations further comprise selecting the friend's network address from member addresses associated with the social network.

10. The system of claim 8, wherein the operations further comprise sending an electronic notification to the recipient network address, the electronic notification notifying of the interim storage to the friend's network address.

11. The system of claim 8, wherein the operations further comprise sending an electronic notification to the friend's network address notifying of the interim storage.

12. The system of claim 8, wherein the operations further comprise querying a database to determine the wireless connectivity associated with the recipient network address.

13. The system of claim 8, wherein the operations further comprise storing electronic database associations between different network addresses and the wireless connectivity.

14. The system of claim 8, wherein the operations further comprise sending an instruction to the friend's network address to interim store the electronic packets of data.

15. A memory device storing code that when executed causes a processor to perform operations, the operations comprising:
   receiving electronic packets of data identifying a recipient network address associated with a mobile device;
   retrieving information describing wireless connectivity associated with the recipient network address;
   determining that the mobile device associated with the recipient network address lacks the wireless connectivity;
   retrieving a social network associated with the recipient network address associated with the mobile device; and
   routing the electronic packets of data for interim storage to a friend's network address associated with the social network.

16. The memory device of claim 15, wherein the operations further comprise selecting the friend's network address from member addresses associated with the social network.

17. The memory device of claim 15, wherein the operations further comprise sending an electronic notification to the network address associated with the mobile device, the electronic notification notifying of the interim storage to the friend's network address.

18. The memory device of claim 15, wherein the operations further comprise sending an electronic notification to the friend's network address notifying of the interim storage.

19. The memory device of claim 15, wherein the operations further comprise querying a database to determine the wireless connectivity associated with the network address.

20. The memory device of claim 15, wherein the operations further comprise sending an instruction to the friend's network address to interim store the electronic packets of data.

* * * * *